US011303100B2

(12) United States Patent
Dubrosky et al.

(10) Patent No.: US 11,303,100 B2
(45) Date of Patent: Apr. 12, 2022

(54) HANGING BRACKET DEVICE FOR ELECTRICAL EQUIPMENT

(71) Applicant: ABB Schweiz AG, Baden (CH)

(72) Inventors: Justin Daniel Dubrosky, Bristol, CT (US); Louis Kenneth McLinden, III, Rocky Hill, CT (US); Shawn Couceiro Fonseca, Newington, CT (US)

(73) Assignee: ABB SCHWEIZ AG, Baden (CH)

( * ) Notice: Subject to any disclaimer, the term of this patent is extended or adjusted under 35 U.S.C. 154(b) by 242 days.

(21) Appl. No.: 16/736,409

(22) Filed: Jan. 7, 2020

(65) Prior Publication Data
US 2021/0210933 A1 Jul. 8, 2021

(51) Int. Cl.
*H02B 1/052* (2006.01)
*H01H 71/02* (2006.01)

(52) U.S. Cl.
CPC ......... *H02B 1/052* (2013.01); *H01H 71/0264* (2013.01)

(58) Field of Classification Search
CPC .............................. H02B 1/052; H01H 71/0264
See application file for complete search history.

(56) References Cited

U.S. PATENT DOCUMENTS

| 3,007,016 A | 10/1961 | Cutler |
| 3,048,672 A | 8/1962 | Cataldo |
| 3,339,038 A | 8/1967 | Jorgensent et al. |
| 4,912,599 A | 3/1990 | Wittmer |
| 5,351,165 A * | 9/1994 | Hancock ................. H02B 1/056 174/68.2 |
| 5,694,288 A * | 12/1997 | Shortt ..................... H02G 1/081 200/294 |
| 5,768,091 A * | 6/1998 | Vinson .................... H02B 1/052 200/293 |
| 5,875,093 A * | 2/1999 | White ..................... H02B 1/056 361/637 |
| 6,229,692 B1 * | 5/2001 | Stendardo ............... H02B 1/04 174/68.2 |
| 2005/0109596 A1 * | 5/2005 | Quintanilla ........... H01H 9/0264 200/293 |
| 2006/0226318 A1 * | 10/2006 | D'Amico ................ H02G 1/00 248/274.1 |
| 2006/0266539 A1 * | 11/2006 | Pickens ................... F16B 9/052 174/58 |
| 2006/0266911 A1 * | 11/2006 | Pickens ................... H02B 1/52 248/507 |
| 2008/0277250 A1 * | 11/2008 | DeCook ............. H01H 71/1054 200/43.14 |

* cited by examiner

*Primary Examiner* — Timothy J Thompson
*Assistant Examiner* — Rhadames Alonzo Miller
(74) *Attorney, Agent, or Firm* — Greenberg Traurig, LLP

(57) ABSTRACT

An apparatus includes a circuit breaker and mounting bracketry fastened to the rear side of the circuit breaker. The mounting bracketry includes first and second spacer portions extending rearward from a respective locations inside the width of the circuit breaker unit, first and second fixation portions extending outward from the first and second spacer portions, respectively, to respective positions outside the width of the circuit breaker, and first and second hook portions extending rearward from the first and second fixation portions, respectively. The circuit breaker may be mounted to an electrical enclosure with the first hook portion and the second hook portion engaging a mounting rail of the electrical enclosure.

20 Claims, 8 Drawing Sheets

HANGING BRACKET DEVICE FOR ELECTRICAL EQUIPMENT

BACKGROUND

The present application relates to apparatuses, methods, systems, and techniques for mounting circuit breaker units. Installation of circuit breaker units typically requires establishing both an electrical connection between a breaker unit and a power supply and a mechanical weight-supporting connection between the breaker unit and a supporting structure to which a circuit breaker unit is mounted. Likewise, removal of circuit breaker units typically requires disconnecting both the electrical connection and the mechanical weight-supporting connection. A problem arises in that the circuit breaker may need to be manually positioned at a location that accommodates the geometry and spacing needs of the electrical connection and this positioning must occur before the mechanical weight-supporting connection is established. Installation and removal of such circuit breaker units, therefore, require an installer or technician to manually support the weight of the circuit breaker during installation or removal operations. The need for manual installer support may be particularly onerous for heavier circuit breaker units and may require the effort of multiple installers. Installation of circuit breaker units may be further limited by the presence of previously installed electrical components in an electrical enclosure. Such components may physically occupy space that could otherwise be occupied by a breaker unit and additional clearance space may be needed further limiting the installation options for circuit breaker units. There remains a substantial need for the unique apparatuses, methods, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

Example embodiments include unique circuit breaker mounting apparatus, methods, and systems Further embodiments, forms, objects, features, advantages, aspects, and benefits shall become apparent from the following description and drawings.

DETAILED DESCRIPTION OF EXAMPLE EMBODIMENTS

Figure 1:
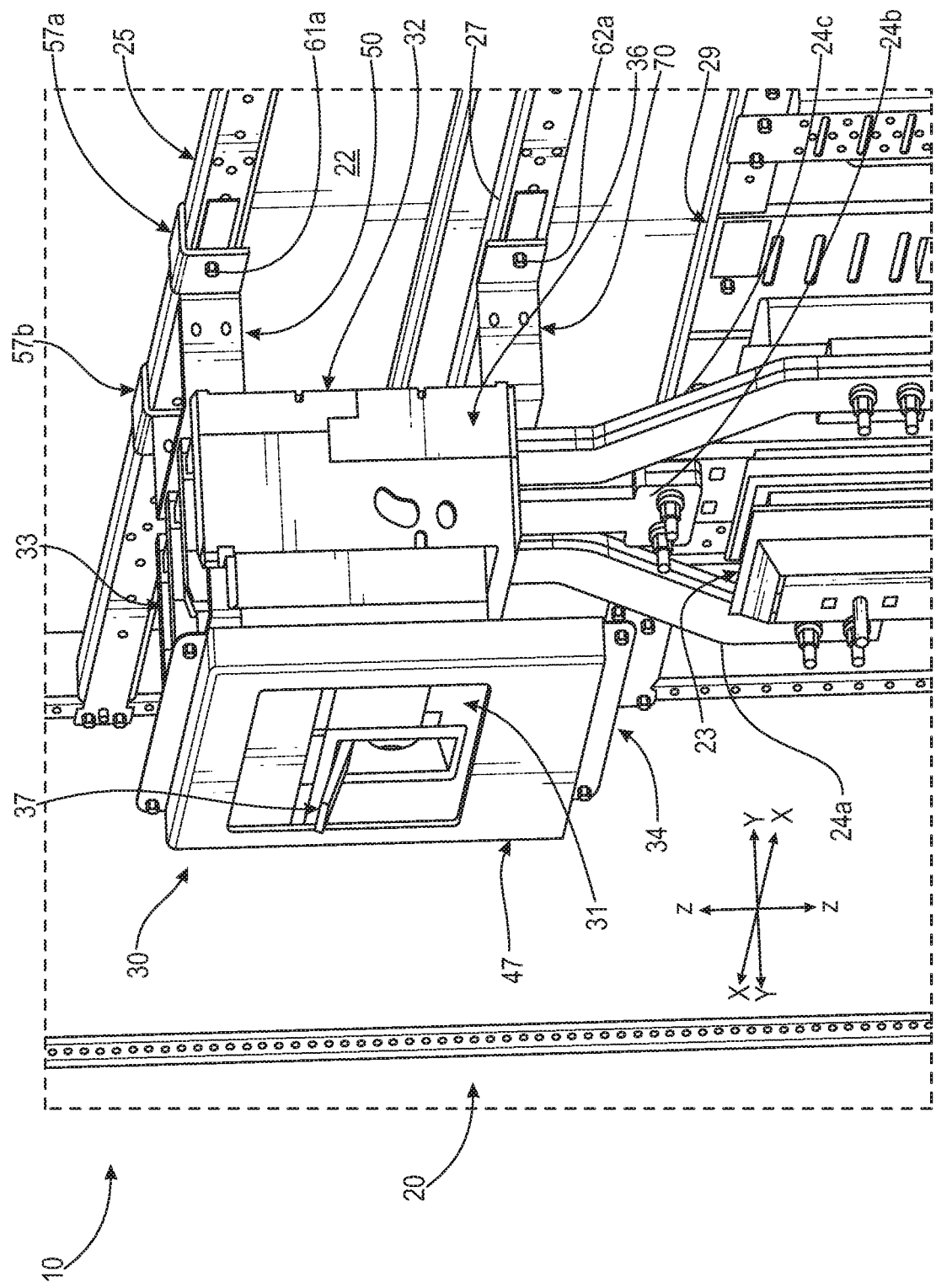
FIG. 1 is a perspective view illustrating certain aspects of an example circuit breaker mounting system.
Figure 1A:
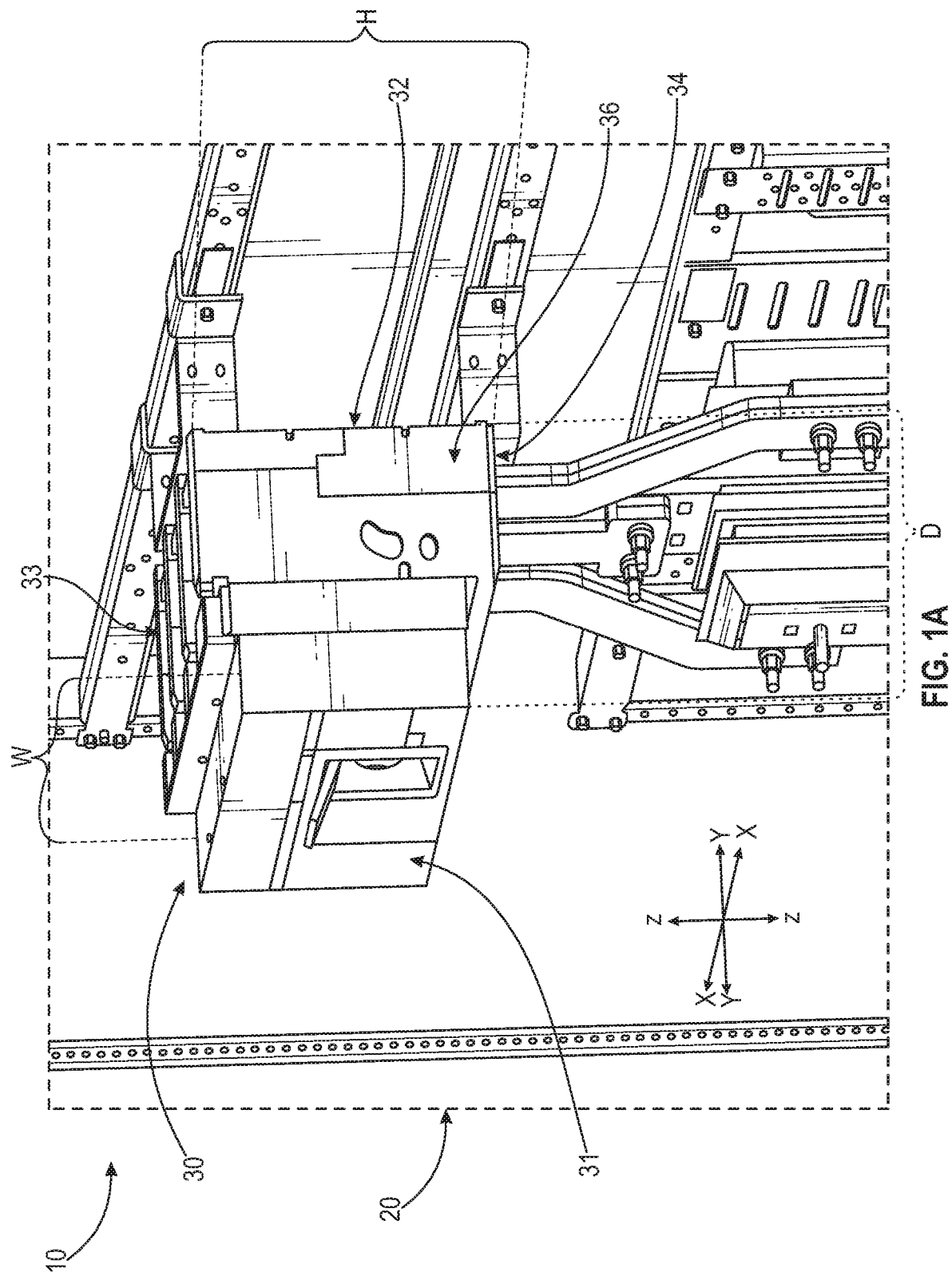
FIG. 1A is a perspective view illustrating certain aspects of the example circuit breaker mounting system of FIG. 1 with a cover removed from the circuit breaker.
Figure 2:
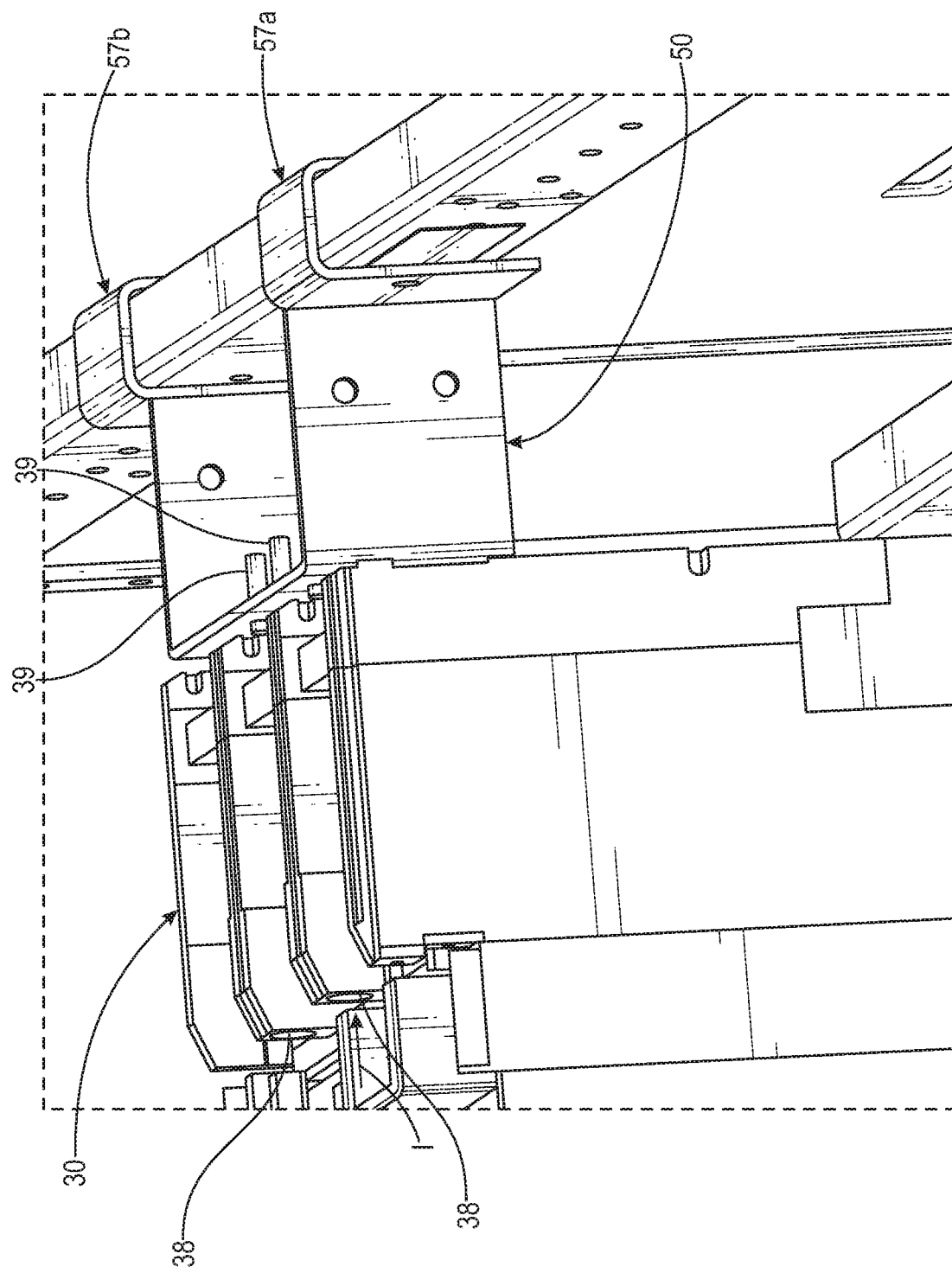
FIG. 2 is a perspective view illustrating certain aspects of a portion of the example circuit breaker mounting system of FIG. 1.
Figure 3:
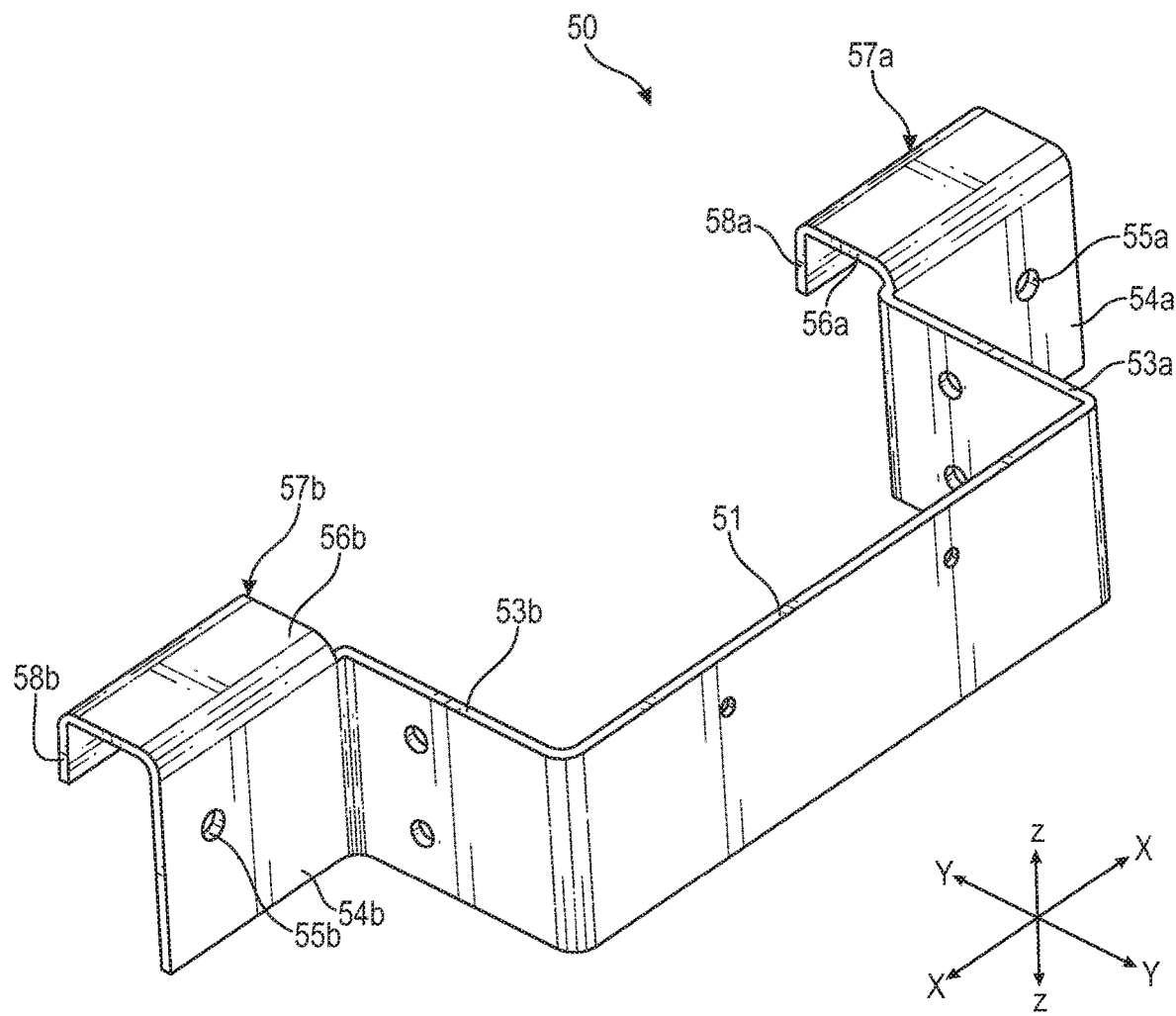
FIG. 3 is a perspective view illustrating certain aspects of example bracketry of the example circuit breaker mounting system of FIG. 1.
Figure 4:
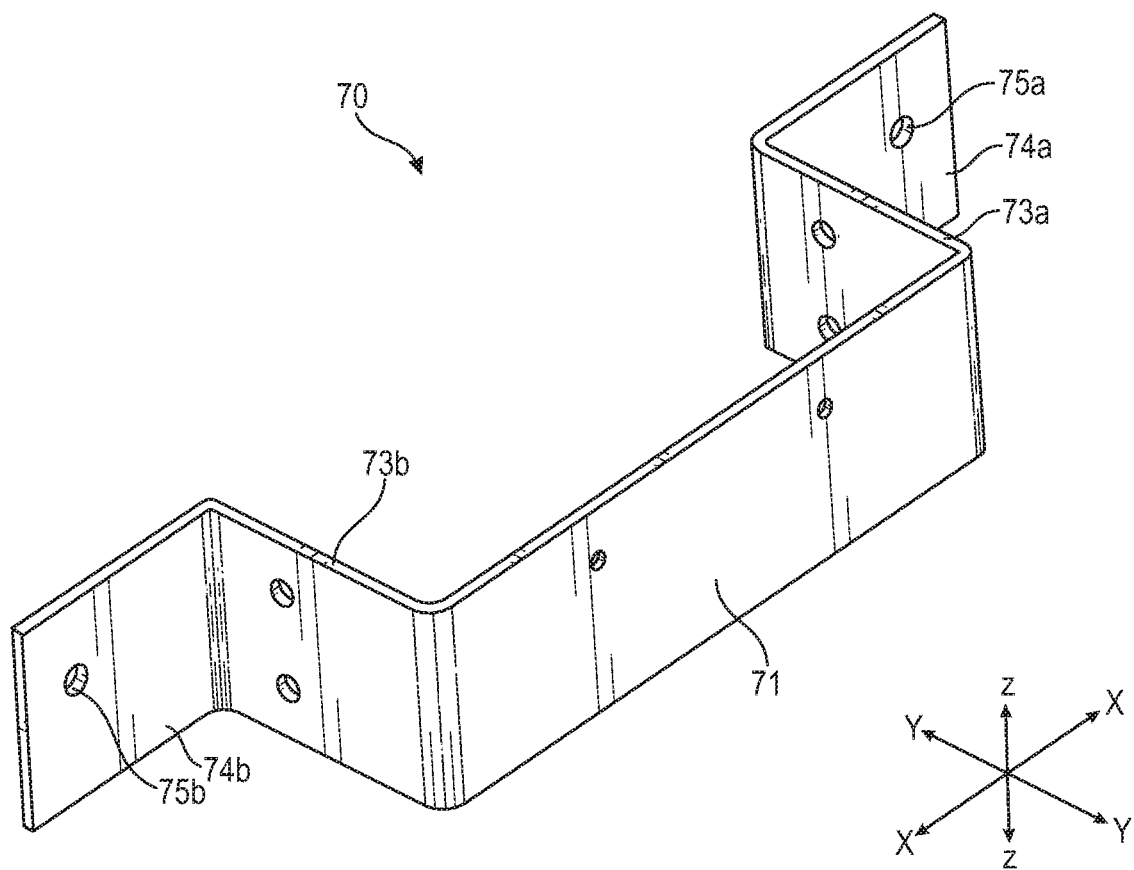
FIG. 4 is a perspective view illustrating certain aspects of example bracketry of the example circuit breaker mounting system of FIG. 1.

Referring now to the several views of the Figures and there are illustrated certain aspects of an example circuit breaker mounting system 10 which may also be referred to herein as system 10 or mounting system 10. The mounting system 10 may be provided and utilized in connection with an electrical enclosure 20 which may be, for example, a power panel, a panel board, a switch board, a power cabinet, or another type of electrical enclosure. The electrical enclosure 20 includes mounting rails 25, 27, and mounting rail system 29 (or 29' in the view of FIG. 7) which are examples of mounting members according to the present disclosure. Mounting rails 25, 27 and mounting rail systems 29, 29' are fastened to the electrical enclosure 20 and are spaced-apart in a forward direction from a rear wall 22 of the electrical enclosure 20. As further described herein, mounting rails 25, 27 and mounting rail systems 29, 29' are configured to mechanically support the weight of components mounted in the electrical enclosure 20.

The mounting system 10 includes a circuit breaker unit 30 which extends over a height H in a Z-axis direction, a width W in an X-axis direction, and a depth D in a Y-axis direction. It shall be appreciated that the circuit breaker unit 30 may also include additional structural components depending on the particular rating or application for which it is configured including, for example, phase barriers, isolation barriers, terminal covers, lugs or other accessories or components and that the height H, the width W, and the depth D may vary from the illustrated example based on the inclusion of such components. The circuit breaker unit 30 includes a front side 31, a rear side 32, an upper side 33, a lower side 34, a left side 35, a right side 36, and a switch handle 37 which is manually accessible from the front side 31 and structured to operate a circuit interrupting mechanism such as a breaker switch provided in the circuit breaker unit 30. The circuit breaker unit 30 is of the molded case circuit breaker type although the circuit breaker unit 30 may alternatively be configured as another type of circuit breaker, electrical interruption device, or electrical switching device. A front cover 47 may be provided proximate the front side 31 of the circuit breaker unit 30 and may be removably installed and fixed to a front portion (not illustrated) of the enclosure 20.

A mounting bracket 50 is fastened to the rear side 32 of the circuit breaker unit 30. The mounting bracket 50 includes a breaker contacting portion 51, spacer portions 53*a*, 53*b*, fixation portions 55*a*, 55*b*, and hook portions 57*a*, 57*b*. The breaker contacting portion 51 contacts the rear side 32 of circuit breaker unit 30 and is fastened thereto by one or more fasteners 39 which pass through apertures 38 on the front side 31 of the circuit breaker unit 30 and engage the breaker contacting portion 51 which is thereby fastened to the rear side 32 of circuit breaker unit 30. In the illustrated embodiment, fasteners 39 are provided as screws which engage threaded apertures provided in the breaker contacting portion 51; however, it shall be appreciated that other embodiments may utilize other types of fasteners.

The spacer portion 53a extends rearward from a location on the rear side 32 of the circuit breaker unit 30 inside the width W of the circuit breaker unit 30. The fixation portion 54a extends outward from the spacer portion 53a to a position outside the width of the circuit breaker unit 30. The fixation portion 54a includes a fastener-receiving aperture 55a which may receive a fastener 61a which engages and maintains mounting bracket 50 in a fixed relationship with mounting rail 25. The hook portion 57a extends rearward and downward from the fixation portion 55a and includes a rearward extending portion 56a and a downward extending portion 58a. The fastener-receiving aperture 55a is manually accessible from the front side 31 of the circuit breaker unit 30 when the hook portion 57a engages the mounting rail 25 and this positioning permits an installer or service technician to introduce a fastener into the fastener-receiving aperture 55a even when only the front side 31 of the breaker unit is accessible, for example, due to the presence of previously installed components.

The spacer portion 53b extends rearward from a location on the rear side 32 of the circuit breaker unit 30 inside the width W of the circuit breaker unit 30. The fixation portion 54b extends outward from the spacer portion 53b to a position outside the width of the circuit breaker unit 30. The fixation portion 54b includes a fastener-receiving aperture 55b which may receive a fastener 61b which engages and maintains mounting bracket 50 in a fixed relationship with mounting rail 25. The hook portion 57b extends rearward from the fixation portion 55b and includes a rearward extending portion 56b and a downward extending portion 58b. The fastener-receiving aperture 55b is manually accessible from the front side 31 of the circuit breaker unit 30 when the hook portion 57b engages the mounting rail 25 and this positioning permits an installer or service technician to introduce a fastener into the fastener-receiving aperture 55b even when only the front side 31 of the breaker unit is accessible, for example, due to the presence of previously installed components.

The several portions of the mounting bracket 50 preferably have dimensions and orientations which provide substantially rigid support for the weight of the breaker unit 30 (e.g., 1% or less displacement in the Z-axis direction) even in the absence of any additional fasteners. The illustrated embodiment provides one example dimensions and orientations providing substantially rigid support for the weight of the breaker unit 30 including one or more of the following aspects of the illustrated example.

In the illustrated example, the breaker contacting portion 51 has a width extending in the X-axis direction, a height extending in the Z-axis direction, and a thickness extending in the Y-axis direction, and the breaker contacting portion 51 is provided as a sheet-like portion with the width and height of the breaker contacting portion 51 being at least 5-10 times greater than its thickness.

In the illustrated example, the spacer portions 53a, 53b are oriented substantially perpendicular to the breaker contacting portion 51 and have respective widths extending in the Y-axis direction, respective heights extending in the Z-axis direction, and respective thicknesses extending in the X-axis direction, and the spacer portions 53a, 53b are provided as sheet-like portions with the width and height of the spacer portions 53a, 53b being at least 5-10 times greater than their thicknesses.

In the illustrated example, the fixation portions 55a, 55b are oriented substantially perpendicular to the spacer portions 53a, 53b and have respective widths extending in the X-axis direction, respective heights extending in the Z-axis direction, and respective thicknesses extending in the Y-axis direction, and the fixation portions 55a, 55b are provided as sheet-like portions with the width and height of the fixation portions 55a, 55b being at least 5-10 times greater than their thicknesses.

In the illustrated example, the extending portions 56a, 56b are oriented substantially perpendicular to the fixation portions 55a, 55b and have respective widths extending in the X-axis direction, respective heights extending in the Y-axis direction, and respective thicknesses extending in the Z-axis direction, and the rearward extending portions 56a, 56b are provided as sheet-like portions with the width and height of the rearward extending portions 56a, 56b being at least 5-10 times greater than their thicknesses.

In the illustrated example, the downward extending portions 58a, 58b are oriented substantially perpendicular to the rearward extending portions 56a, 56b and have respective widths extending in the X-axis direction, respective heights extending in the Z-axis direction, and respective thicknesses extending in the Y-axis direction, and the downward extending portions 58a, 58b are provided as sheet-like portions with the width and height of the downward extending portions 58a, 58b being at least 5-10 times greater than their thicknesses.

In the illustrated embodiment, the mounting bracketry 50 is provided as a unitary structure bracket formed from a single piece of material, for example, by bending or crimping. In other embodiments, the mounting bracketry 50 may be provided as a unitary structure bracket formed from two or more pieces piece of material, for example by welding, interference fitting or other fastening techniques. In other embodiments, the mounting bracketry 50 may be provided as a compound structure including multiple parts separate from one another, for example, by dividing the breaker contacting portion 51 into separate pieces.

A mounting bracket 70 is fastened to the rear side 32 of the circuit breaker unit 30. The mounting bracket 70 includes a breaker contacting portion 71, spacer portions 73a, 73b, and fixation portions 75a, 75b. The breaker contacting portion 71 contacts the rear side 32 of the circuit breaker unit 30 and is fastened thereto by one or more fasteners similar to fasteners 39 which pass through apertures similar to apertures 38 on the front side 31 of the circuit breaker unit 30 and engage the breaker contacting portion 71 which contacts the rear side 32 of circuit breaker unit 30. These fasteners are provided as screws which engage threaded apertures provided in the breaker contacting portion 71. It shall be appreciated, however, that other embodiments may utilize other types of fasteners.

The spacer portion 73a extends rearward from a location on the rear side 32 of the circuit breaker unit 30 inside the width of the circuit breaker unit 30. The fixation portion 74a extends outward from the spacer portion 73a to a position outside the width of the circuit breaker unit 30. The fixation portion 74a includes a fastener-receiving aperture 75a which may receive a fastener 62a which engages and maintains mounting bracket 50 in a fixed relationship with mounting rail 25.

The spacer portion 73b extends rearward from a location on the rear side 32 of the circuit breaker unit 30 inside the width of the circuit breaker unit 30. The fixation portion 74b extends outward from the spacer portion 73b to a position outside the width of the circuit breaker unit 30. The fixation portion 74b includes a fastener-receiving aperture 75b which may receive a fastener 62b which engages and maintains mounting bracket 50 in a fixed relationship with mounting rail 27.

The several portions of the mounting bracket 70 preferably have dimensions and orientations which provide substantially rigid support for the weight of the breaker unit 30 (e.g., 1% or less displacement in the Z-axis direction) even in the absence of any additional fasteners. The illustrated embodiment provides one example dimensions and orientations providing substantially rigid support for the weight of the breaker unit 30 including one or more of the following aspects of the illustrated example.

In the illustrated example, the breaker contacting portion 71 has a width extending in the X-axis direction, a height extending in the Z-axis direction, and a thickness extending in the Y-axis direction, and the breaker contacting portion 71 is provided as a sheet-like portion with the width and height of the breaker contacting portion 71 being at least 5-10 times greater than its thickness.

In the illustrated example, the spacer portions 73a, 73b are oriented substantially perpendicular to the breaker contacting portion 71 and have respective widths extending in the Y-axis direction, respective heights extending in the Z-axis direction, and respective thicknesses extending in the X-axis direction, and the spacer portions 73a, 73b are provided as sheet-like portions with the width and height of the spacer portions 73a, 73b being at least 5-10 times greater than their thicknesses.

In the illustrated example, the fixation portions 75a, 75b are oriented substantially perpendicular to the spacer portions 73a, 73b and have respective widths extending in the X-axis direction, respective heights extending in the Z-axis direction, and respective thicknesses extending in the Y-axis direction, and the fixation portions 75a, 75b are provided as sheet-like portions with the width and height of the fixation portions 75a, 75b being at least 5-10 times greater than their thicknesses.

In the illustrated embodiment the mounting bracketry 70 is provided as a unitary structure bracket formed from a single piece of material, for example, by bending or crimping. In other embodiments, the mounting bracketry 70 may be provided as a unitary structure bracket formed from two or more pieces piece of material, for example by welding, interference fitting or other fastening techniques. In other embodiments, the mounting bracketry 70 may be provided as a compound structure including multiple parts separate from one another, for example, by dividing the breaker contacting portion 71 into separate pieces.

Mounting bracket 50 and mounting bracket 70 are examples of mounting bracketry according to the present disclosure. It shall be appreciated that a number of further examples of mounting bracketry are also contemplated including, for example, bracketry with non-sheet-like portions, non-perpendicular portions oriented at obtuse or acute angles relative to one another, and/or bracketry providing different clearances relative to the other illustrated structures. In certain further examples, mounting bracket 50 and mounting bracket 70 may be secured to circuit breaker unit 30 in other manners, for example, by at least partially or completely wrapping around to the front surface 31 of the circuit breaker unit 30, or by interfacing with attachment recesses, openings or other features provided at various locations about the circuit breaker unit 30. In certain further examples, additional bracketry may be present above and/or below the circuit breaker unit 30.

A busbar 23 is fastened to mounting rail system 29 which is positioned below the mounting rail 27 (or, in the view of FIG. 7, to mounting rail system 29' which is positioned above the mounting rail 25.) In the illustrated embodiment, the busbar 23 is provided as a three-phase busbar wherein a first phase of the circuit breaker unit 30 is electrically coupled with a first phase of the busbar 23 by conductive strap 24a, a second first phase of the circuit breaker unit 30 is electrically coupled with a first phase of the busbar 23 by conductive strap 24a, and a third first phase of the circuit breaker unit 30 is electrically coupled with a first phase of the busbar 23 by conductive strap 24a. In other embodiments, the busbar 23 and the circuit breaker unit 30 may be provided with a different number of phases. It shall be appreciated that the mounting system 10 is configured to accommodate electrical coupling with the busbar 23 fastened to the mounting rail system 29 at a location below the breaker unit 30 in the Z-axis direction (e.g., as shown in FIG. 5) or electrical coupling with the busbar 23 fastened to the mounting rail system 29' at a location above the breaker unit 30 in the Z-axis direction (e.g., as shown in FIG. 5) without requiring any modification to or repositioning of the breaker unit 30, the bracket 50, or the bracket 70.

Figure 5:
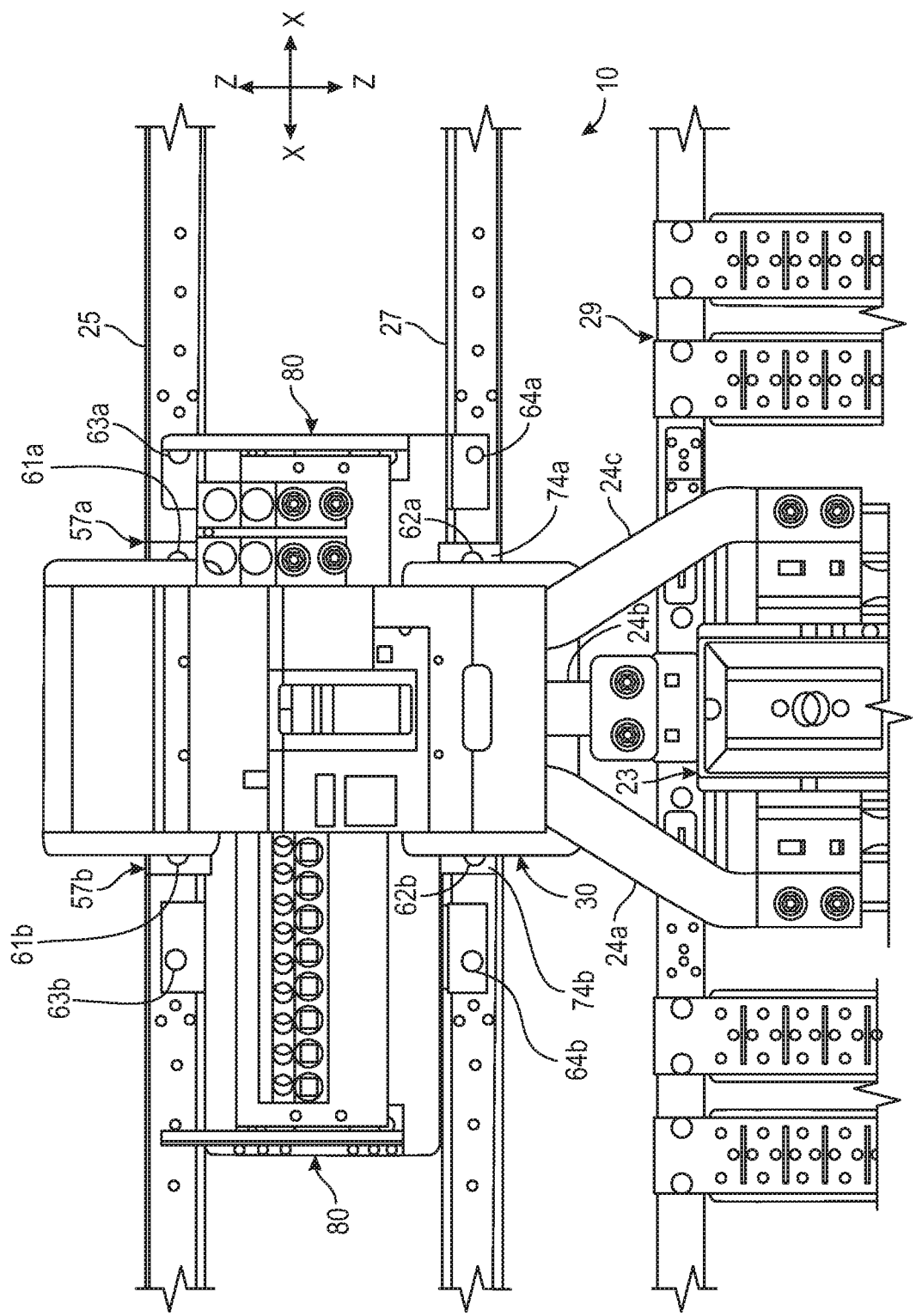
FIGS. 5 and 6 are a front view and a top view, respectively, illustrating certain aspects of the example circuit breaker mounting system of FIG. 1 in combination with additional electrical components.
Figure 6:
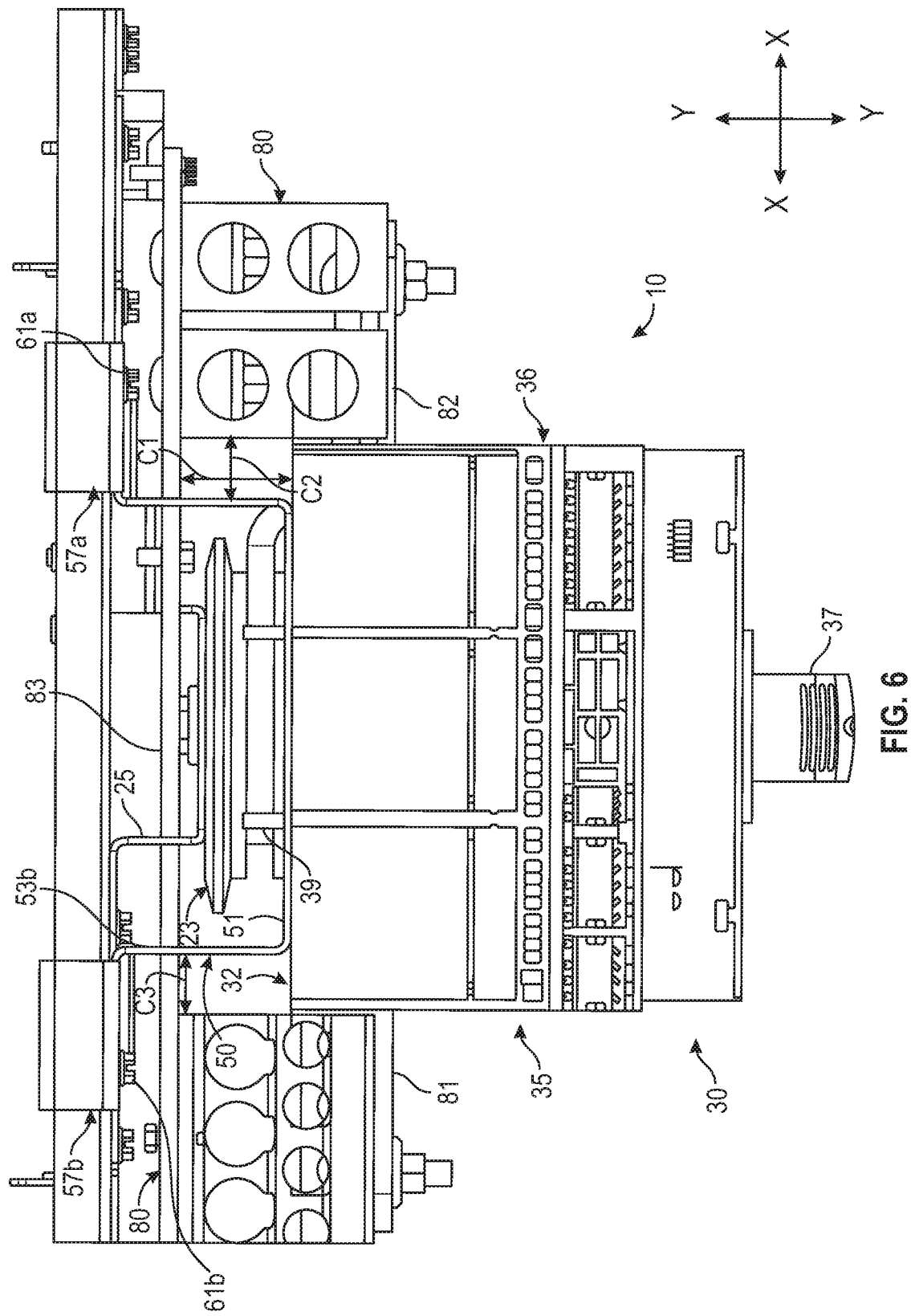
Figure 7:
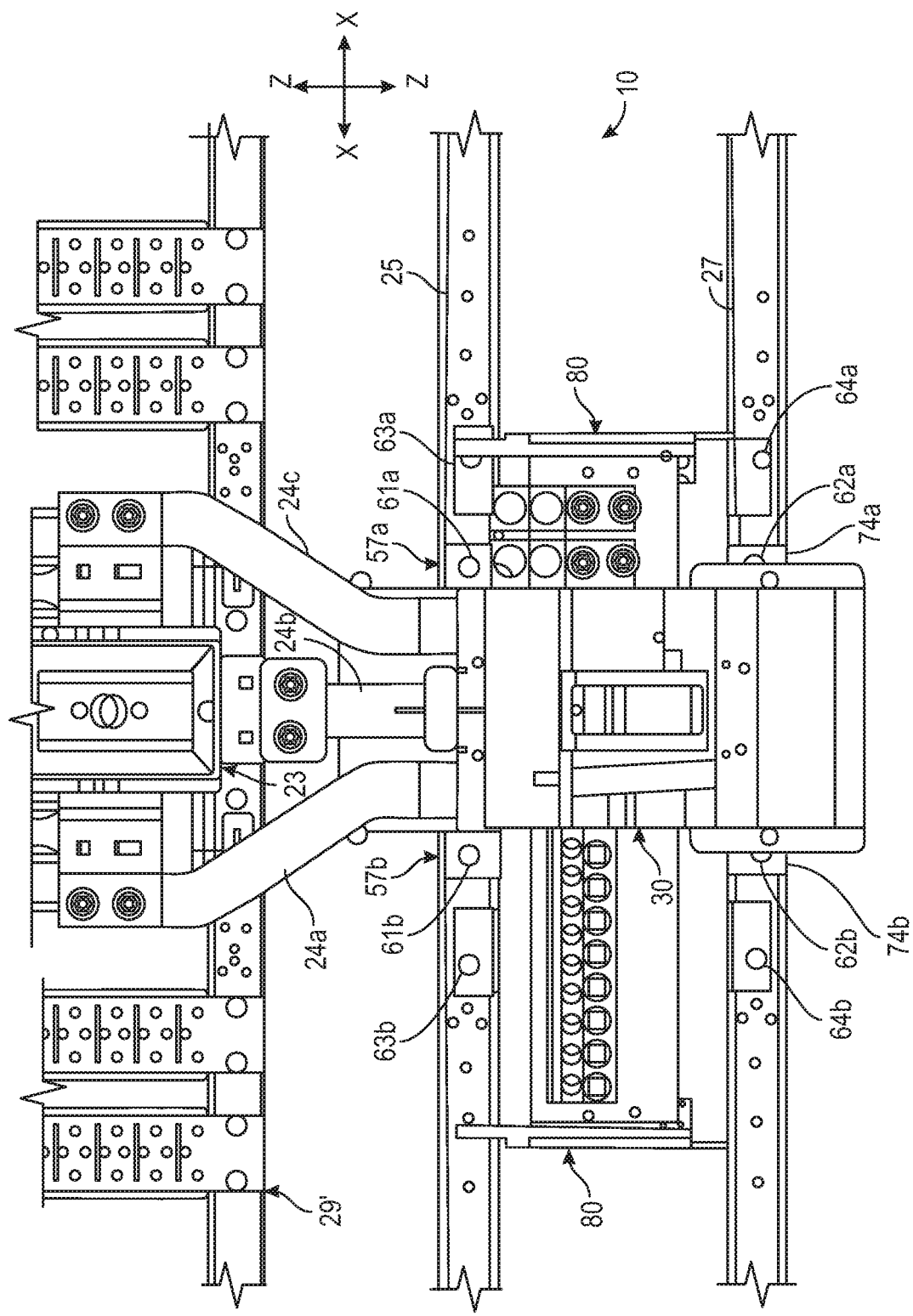
FIG. 7 is a front view illustrating an alternate configuration of the example circuit breaker mounting system of FIG. 1 in combination with the additional electrical components of FIGS. 5 and 6.

With particular reference now to FIGS. 5-7, there are illustrated views of system 10 wherein the electrical enclosure 20 includes a neutral kit 80 including neutral terminals 81, 82 and lateral member 83. The neutral kit 80 is fastened to the mounting rails 25, 27 of the electrical enclosure 80 by one or more fasteners 63a, 63b, 64a, 64b. The neutral terminals 81, 82 and the lateral member 83 the neutral kit 80 are examples of previously installed electrical components according to the present disclosure. The positioning of the bracket 50 and the bracket 70 accommodate the neutral kit 80 extending within the width of the circuit breaker unit 30. In the illustrated embodiment, for example, the lateral member 83 of the neutral kit 80 extends across substantially the entire width W of the circuit breaker unit 30. A clearance indicated by arrow C1 is provided between the lateral member 83 and the rear side 32 of the circuit breaker unit 30. A clearance indicated by arrow C2 is provided between the neutral terminal 82 and the spacer portion 53a of the bracket 50 and the spacer portion 73a of the bracket 70. A clearance indicated by arrow C3 is provided between the neutral terminal 81 and the spacer portion 53b of the bracket 50 and the spacer portion 73b of the bracket 70. It shall be appreciated that the magnitude of these and other over-surface and through-air clearances may be selected to meet or exceed one or more minimum distances as would occur to one of skill in the art with the benefit of the present disclosure in order to provide sufficient electrical isolation from live components of the system.

During installation, the breaker unit 30 may be fastened to or provided in a pre-fastened state with the mounting bracketry 50 and the mounting bracketry 70. The hook portions 57a, 57b may be positioned to pass over and engage the mounting rail 25 and the fixation portions 74a, 74b may be positioned to rest against the mounting rail 27. In this positioning, the weight of the breaker unit is supported. At this point, the mounting bracketry 50 and the mounting bracketry 70 fully support the weight of the breaker unit 30, but the breaker unit 30 may still be moved laterally relative to the mounting rails 25, 27. The breaker unit 30 may be positioned in relation to the busbar 23 to facilitate the electrical connection of the breaker unit 30 and the busbar 23 via the conductive straps 24a, 24b, 24c. The breaker unit 30 may then be fastened in a fixed relationship with the mounting rails 25 and 27 by fastening the bracket 50 to the mounting rail 25 with fasteners 61a, 61b and fastening the bracket 70 to the mounting rail 27 with fasteners 62a, 62b.

A number of example embodiments and various forms thereof shall now be further described. A first embodiment is an apparatus comprising: a circuit breaker unit extending over a height, a width, and a depth, and including a rear side, a front side, and a switch handle manually accessible from the front side; and first mounting bracketry fastened to the rear side of the circuit breaker unit and including a first spacer portion extending rearward from a first location on the rear side of the circuit breaker unit inside the width of the circuit breaker unit, a first fixation portion extending outward from the first spacer portion to a position outside the width of the circuit breaker unit and including a first fastener-receiving aperture, a first hook portion extending rearward from the first fixation portion, a second spacer portion extending rearward from a second location on the rear side of the circuit breaker unit inside the width of the circuit breaker unit, a second fixation portion extending outward from the second spacer portion to a position outside the width of the circuit breaker unit and including a second fastener-receiving aperture, and a second hook portion extending rearward from the second fixation portion.

Certain forms of the first example embodiment comprise second mounting bracketry fastened to the rear side of the circuit breaker and including a third spacer portion extending rearward from a third location on the rear side of the circuit breaker unit inside the width of the circuit breaker unit, and a fourth spacer portion extending rearward from a fourth location on the rear side of the circuit breaker unit inside the width of the circuit breaker unit, the third location and the fourth location being below the first location and the second location. In certain forms, the circuit breaker unit is mounted to an electrical enclosure with the first hook portion and the second hook portion engaging a mounting rail of the electrical enclosure. In certain forms, the first hook portion and the second hook portion support the weight of the circuit breaker unit in the absence of any fastener fastening the circuit breaker to any other structure. In certain forms, the circuit breaker unit is laterally moveable relative to the mounting rail while continuing to support the weight of the circuit breaker unit. In certain forms, the electrical enclosure includes one or more previously installed electrical components and the positioning of the first bracketry and the second bracketry accommodate at least one of the one or more previously installed electrical components extending within the width of the circuit breaker unit. In certain forms, a first clearance is provided between the at least one of the previously installed electrical components and the rear side of the circuit breaker unit, and a second clearance is provided between the at least one of the previously installed electrical components and the first spacer portion of the first bracketry. In certain forms, the previously installed electrical component includes a neutral kit. In certain forms, the neutral kit includes a lateral member spanning the width of the circuit breaker unit. In certain forms, the first mounting bracketry is fastened to the rear side by one or more bracketry fasteners passing through one or more respective apertures from the front font side of the circuit breaker to the rear side of the circuit breaker unit.

A second example embodiment is a system comprising: a circuit breaker extending over a height, a width, and a depth, and including a rear side, a front side, and a switch handle manually accessible from the front side; first mounting bracketry fastened to the rear side of the circuit breaker unit and including a first spacer portion extending rearward from a first location on the rear side of the circuit breaker unit inside the width of the circuit breaker unit, a first fixation portion extending outward from the first spacer portion to a position outside the width of the circuit breaker unit and including a first fastener-receiving aperture, a first hook portion extending rearward from the first fixation portion, a second spacer portion extending rearward from a second location on the rear side of the circuit breaker unit inside the width of the circuit breaker unit, a second fixation portion extending outward from the second spacer portion to a position outside the width of the circuit breaker unit and including a second fastener-receiving aperture, and a second hook portion extending rearward from the second fixation portion; and an electrical enclosure including a mounting member wherein the circuit breaker unit is mounted to the electrical enclosure with the first hook portion and the second hook portion engaging of the electrical enclosure.

In certain forms of the second example embodiment, a first clearance is provided between the at least one of the previously installed electrical components and the rear side of the circuit breaker unit. In certain forms, a second clearance is provided between the at least one of the previously installed electrical components and the first spacer portion of the first bracketry. Certain forms comprise second mounting bracketry fastened to the rear side of the circuit breaker and positioned below the first mounting bracketry. In certain forms, the second mounting bracketry comprises a third spacer portion extending rearward from a third location on the rear side of the circuit breaker unit inside the width of the circuit breaker unit, and a fourth spacer portion extending rearward from a fourth location on the rear side of the circuit breaker unit inside the width of the circuit breaker unit, the third location and the fourth location being below the first location and the second location.

A third example embodiment is an apparatus comprising: a circuit breaker extending over a height, a width, and a depth, and including a rear side, and a front side; and first mounting bracketry fastened to the rear side of the circuit breaker and including a first spacer portion extending rearward from a first location on the rear side of the circuit breaker inside the width of the circuit breaker, a first fixation portion extending outward from the first spacer portion to a position outside the width of the circuit breaker and including a first fastener-receiving aperture, a first hook portion extending rearward from the first fixation portion, a second spacer portion extending rearward from a second location on the rear side of the circuit breaker inside the width of the circuit breaker, a second fixation portion extending outward from the second spacer portion to a position outside the width of the circuit breaker and including a second fastener-receiving aperture, and a second hook portion extending rearward from the second fixation portion.

In certain forms of the third example embodiment, the first mounting bracketry includes a first spacer portion extending rearward from a first location on the rear side of the circuit breaker inside the width of the circuit breaker, a first fixation portion extending outward from the first spacer portion to a position outside the width of the circuit breaker and including a first fastener-receiving aperture, a first hook portion extending rearward from the first fixation portion, a second spacer portion extending rearward from a second location on the rear side of the circuit breaker inside the width of the circuit breaker, a second fixation portion extending outward from the second spacer portion to a position outside the width of the circuit breaker and including a second fastener-receiving aperture. In certain forms, the first spacer portion includes a first dimension extending in the direction of the height of the breaker unit and a second dimension extending in the direction of the width of the beaker unit, the first dimension being 10 times or greater than the second dimension. In certain forms, the first mounting bracketry is structured as a single-piece bracket. Certain forms comprise second mounting bracketry fastened to the rear side of the circuit breaker and including a third spacer portion extending rearward from a third location on the rear side of the circuit breaker inside the width of the circuit breaker, and a fourth spacer portion extending rearward from a fourth location on the rear side of the circuit breaker inside the width of the circuit breaker, the third location and the fourth location being below the first location and the second location.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
    a circuit breaker unit extending over a height, a width, and a depth, and including a rear side, a front side, and a switch handle manually accessible from the front side; and
    first mounting bracketry fastened to the rear side of the circuit breaker unit and including a first spacer portion extending rearward from a first location on the rear side of the circuit breaker unit inside the width of the circuit breaker unit, a first fixation portion extending outward from the first spacer portion to a position outside the width of the circuit breaker unit and including a first fastener-receiving aperture, a first hook portion extending rearward from the first fixation portion, a second spacer portion extending rearward from a second location on the rear side of the circuit breaker unit inside the width of the circuit breaker unit, a second fixation portion extending outward from the second spacer portion to a position outside the width of the circuit breaker unit and including a second fastener-receiving aperture, and a second hook portion extending rearward from the second fixation portion.

2. The apparatus of claim 1 comprising second mounting bracketry fastened to the rear side of the circuit breaker and including a third spacer portion extending rearward from a third location on the rear side of the circuit breaker unit inside the width of the circuit breaker unit, and a fourth spacer portion extending rearward from a fourth location on the rear side of the circuit breaker unit inside the width of the circuit breaker unit, the third location and the fourth location being below the first location and the second location.

3. The apparatus of claim 1 wherein the circuit breaker unit is mounted to an electrical enclosure with the first hook portion and the second hook portion engaging a mounting rail of the electrical enclosure.

4. The apparatus of claim 3 wherein the first hook portion and the second hook portion support the weight of the circuit breaker unit in the absence of any fastener fastening the circuit breaker to any other structure.

5. The apparatus of claim 4 wherein the circuit breaker unit is laterally moveable relative to the mounting rail while continuing to support the weight of the circuit breaker unit.

6. The apparatus of claim 3 wherein the electrical enclosure includes one or more previously installed electrical components and the positioning of the first bracketry and the second bracketry accommodate at least one of the one or more previously installed electrical components extending within the width of the circuit breaker unit.

7. The apparatus of claim 6 wherein a first clearance is provided between the at least one of the previously installed electrical components and the rear side of the circuit breaker unit, and a second clearance is provided between the at least one of the previously installed electrical components and the first spacer portion of the first bracketry.

8. The apparatus of claim 6 wherein the previously installed electrical component includes a neutral kit.

9. The apparatus of claim 8 wherein the neutral kit includes a lateral member spanning the width of the circuit breaker unit.

10. The apparatus of claim 1 wherein the first mounting bracketry is fastened to the rear side by one or more bracketry fasteners passing through one or more respective apertures from the front font side of the circuit breaker to the rear side of the circuit breaker unit.

11. A system comprising:
    a circuit breaker extending over a height, a width, and a depth, and including a rear side, a front side, and a switch handle manually accessible from the front side;
    first mounting bracketry fastened to the rear side of the circuit breaker unit and including a first spacer portion extending rearward from a first location on the rear side of the circuit breaker unit inside the width of the circuit breaker unit, a first fixation portion extending outward from the first spacer portion to a position outside the width of the circuit breaker unit and including a first fastener-receiving aperture, a first hook portion extending rearward from the first fixation portion, a second spacer portion extending rearward from a second location on the rear side of the circuit breaker unit inside the width of the circuit breaker unit, a second fixation portion extending outward from the second spacer portion to a position outside the width of the circuit breaker unit and including a second fastener-receiving aperture, and a second hook portion extending rearward from the second fixation portion; and
    an electrical enclosure including a mounting member wherein the circuit breaker unit is mounted to the electrical enclosure with the first hook portion and the second hook portion engaging of the electrical enclosure.

12. The system of claim 11 wherein a first clearance is provided between the at least one of the previously installed electrical components and the rear side of the circuit breaker unit.

13. The system of claim 12 wherein a second clearance is provided between the at least one of the previously installed electrical components and the first spacer portion of the first bracketry.

14. The system of claim 11 comprising second mounting bracketry fastened to the rear side of the circuit breaker and positioned below the first mounting bracketry.

15. The system of claim 14 wherein the second mounting bracketry comprises a third spacer portion extending rearward from a third location on the rear side of the circuit breaker unit inside the width of the circuit breaker unit, and a fourth spacer portion extending rearward from a fourth location on the rear side of the circuit breaker unit inside the width of the circuit breaker unit, the third location and the fourth location being below the first location and the second location.

16. An apparatus comprising:
a circuit breaker extending over a height, a width, and a depth, and including a rear side, and a front side; and
first mounting bracketry fastened to the rear side of the circuit breaker and including a first spacer portion extending rearward from a first location on the rear side of the circuit breaker inside the width of the circuit breaker, a first fixation portion extending outward from the first spacer portion to a position outside the width of the circuit breaker and including a first fastener-receiving aperture, a first hook portion extending rearward from the first fixation portion, a second spacer portion extending rearward from a second location on the rear side of the circuit breaker inside the width of the circuit breaker, a second fixation portion extending outward from the second spacer portion to a position outside the width of the circuit breaker and including a second fastener-receiving aperture, and a second hook portion extending rearward from the second fixation portion.

17. The apparatus of claim 16 wherein the first mounting bracketry includes a first spacer portion extending rearward from a first location on the rear side of the circuit breaker inside the width of the circuit breaker, a first fixation portion extending outward from the first spacer portion to a position outside the width of the circuit breaker and including a first fastener-receiving aperture, a first hook portion extending rearward from the first fixation portion, a second spacer portion extending rearward from a second location on the rear side of the circuit breaker inside the width of the circuit breaker, a second fixation portion extending outward from the second spacer portion to a position outside the width of the circuit breaker and including a second fastener-receiving aperture.

18. The apparatus of claim 17 wherein the first spacer portion includes a first dimension extending in the direction of the height of the breaker unit and a second dimension extending in the direction of the width of the beaker unit, the first dimension being 10 times or greater than the second dimension.

19. The apparatus of claim 16 wherein the first mounting bracketry is structured as a single-piece bracket.

20. The apparatus of claim 16 comprising second mounting bracketry fastened to the rear side of the circuit breaker and including a third spacer portion extending rearward from a third location on the rear side of the circuit breaker inside the width of the circuit breaker, and a fourth spacer portion extending rearward from a fourth location on the rear side of the circuit breaker inside the width of the circuit breaker, the third location and the fourth location being below the first location and the second location.

* * * * *